United States Patent [19]

Engel et al.

[11] Patent Number: 5,548,683

[45] Date of Patent: Aug. 20, 1996

[54] DATA FUSION NEURAL NETWORK

[75] Inventors: Stephen J. Engel, East Northport, N.Y.; Clark Jeffries, Clemson, S.C.; Christopher Lee, Northfield, Minn.

[73] Assignee: Grumman Aerospace Corporation, Los Angeles, Calif.

[21] Appl. No.: 238,519

[22] Filed: May 5, 1994

[51] Int. Cl.⁶ .............................. G06E 1/00; G06E 3/00; G06F 15/18
[52] U.S. Cl. ................................................. 395/21; 395/22
[58] Field of Search .......................... 395/20–25, 27; 382/155–159; 364/807

[56] References Cited

U.S. PATENT DOCUMENTS

| | | | |
|---|---|---|---|
| 4,802,103 | 1/1989 | Faggin et al. | 395/24 |
| 5,195,170 | 3/1993 | Eberhardt | 395/24 |
| 5,220,202 | 6/1993 | Isono et al. | 395/21 |
| 5,276,770 | 1/1994 | Castelaz | 395/23 |
| 5,313,558 | 5/1994 | Adams | 395/22 |
| 5,416,850 | 5/1995 | Takatori et al. | 382/159 |
| 5,428,710 | 6/1995 | Toomarian et al. | 395/23 |

OTHER PUBLICATIONS

Ansari et al, "A new method to optimize the satellite broadcasting schedules using the main field annealing of a Hopfield neural network"; IEEE Transactions on Neural Networks, vol. 6, iss. 2, pp. 470–483, Mar. 1995.

Eberhardt et al, "A VLSI neuroprocessor for dynamic assignment of resources"; 1990 IEEE International conference on systems, man, and cybernetics conference proceedings, pp. 711–714, 4–7 Nov. 1990.

Fincher et al, "Multi–sensor data fusion using neural networks"; 1990 IEEE international conference on systems, man and cybernetics conference proceedings, pp. 835–838, 4–7 Nov. 1990.

Chaudhuri et al, "Neural networks for data fusion"; IEEE International conference on systems engineering, pp. 327–330, 9–11 Aug. 1990.

Rajapakse et al, "Multi sensor data fusion within hierarchical neural networks"; IJCNN International Joint Conference on Neural Networks, pp. 17–22 vol. 2, 17–21 Jun. 1990.

Lure et al, "Hardware based neural network data fusion for classification of earth surface conditions"; conference record of the twenty–sixth asilomar conference on signals, systems and computers, pp. 761–765 vol. 2, 26–28 Oct. 1992.

*Primary Examiner*—Robert W. Downs
*Assistant Examiner*—Jariq R. Hafiz
*Attorney, Agent, or Firm*—Terry J. Anderson; Karl J. Hoch, Jr.

[57] ABSTRACT

An information processing system and method forms a fast optimal or near optimal association based on satisfying global constraints expressed in an association matrix by simulating the behavior of a network of interconnected processing elements resembling neurons in a brain.

29 Claims, 5 Drawing Sheets

DATA FUSION NEURAL NETWORK

BACKGROUND OF THE INVENTION

1. Field of the Invention

This invention relates to a signal processing system and method, and in particular to a hardware implementation of a neural network-based signal processing system and method.

2. Description of Related Art

Present approaches to data fusion, unlike the approach of the invention, are purely mathematical in nature. No apparatus currently exists which is specifically designed for data fusion. Instead, the common practice is to run traditional association techniques, such as the sub-optimal nearest neighbor technique or the optimal Munkres algorithm, on a conventional or parallel general purpose computer.

Association techniques can be applied to a large class of problems arising from real-world situations, including target tracking and telecommunications. The approach for solving this class of problems usually involves minimizing some quantity referred to as a cost. A cost may, for example, be related to the dissimilarity of objects to be associated, the energy required to perform a specific operation, the distance to be traveled, or money to be spent.

Figure 1:
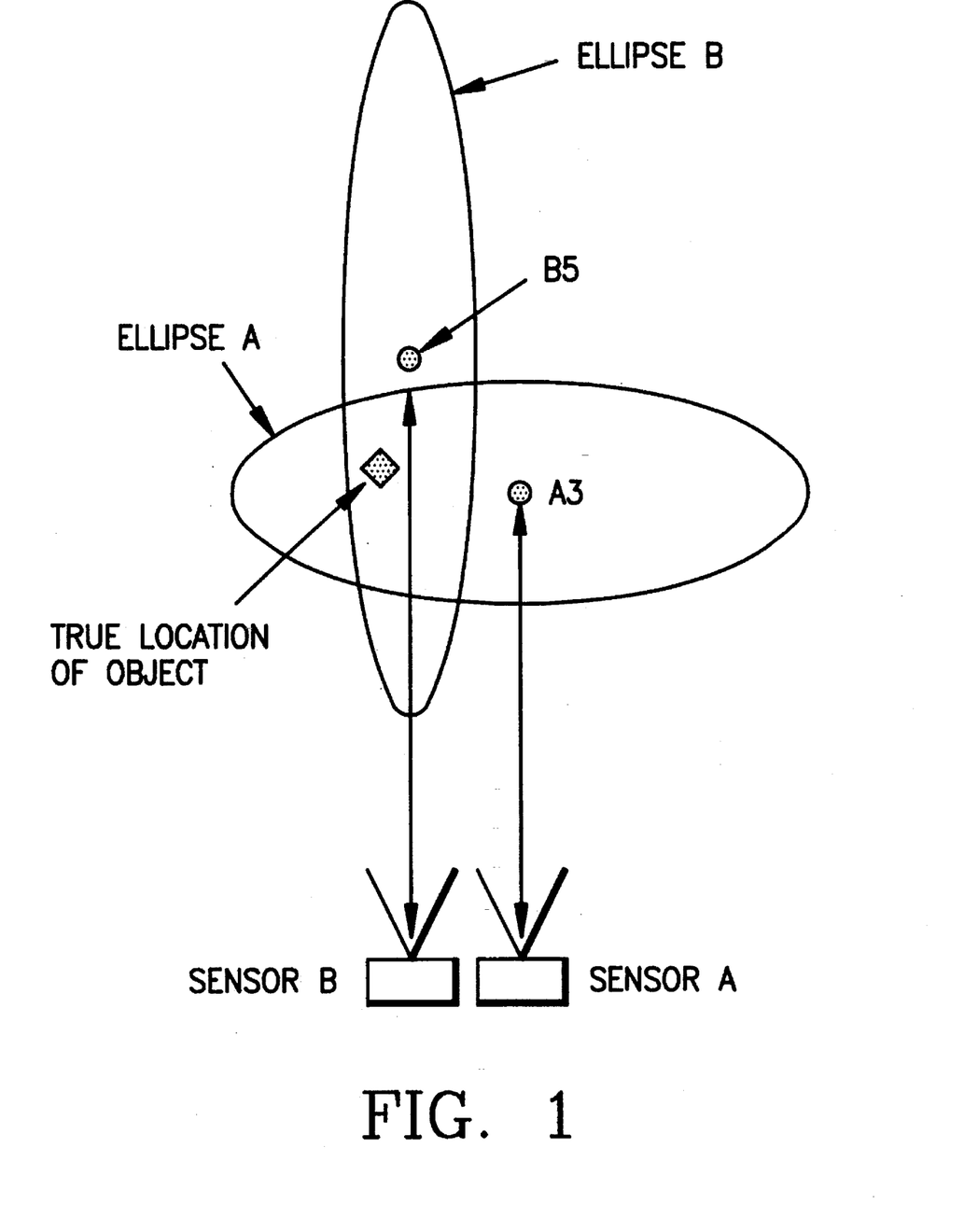
FIG. 1 is a schematic diagram which illustrates the principles of sensor fusion utilized by the present invention.

A typical association problem involves combining the information from two or more sources referring to the same set of objects. The association from one source of information about a particular object to another source of information about the same object is trivial if the two sources have no ambiguity about the objects. However, in many real-world situations, uncertainties in the information make the associations nontrivial. One such situation, illustrated in FIG. 1, is the situation where information about a given object from more than one sensor is combined. The information combination technique, called sensor fusion, produces information about an object by fusing information from several sources. The sensor fusion technique must unambiguously associate data from each sensor that corresponds to a given object.

FIG. 1 illustrates the situation where two sensors A and B are used to measure the position of several objects. Sensor A may, for example, have fine resolution in its range measurement and course resolution in its azimuth measurement while sensor B has poorer range resolution and better azimuth resolution. Assuming that the third report from sensor A indicates that there is an object at location A3 and the fifth report from sensor B indicates an object at location B5. Given the uncertainties in sensor A, the true position of the object described in the third report from sensor A (shown as a diamond) may be anywhere within the error ellipse labelled "A" in FIG. 1, while the location of the object described in the fifth report from sensor B can be anywhere within the error ellipse labeled B in the figure. If it were possible to note that the third report from sensor A refers to the same object as the fifth report from sensor B, then the range from sensor A combined with the azimuth from sensor B would provide more accurate information about that object than either sensor's data taken individually. If there is only one object in the vicinity and both sensors see only that object, the association of A3 to B5 is trivial, but the association process becomes nontrivial when there are several objects in the error ellipses or one sensor sees objects that the other misses. The solution then requires an association that considers the global effect of making associations which may not necessarily be the best local associations.

Figure 2:
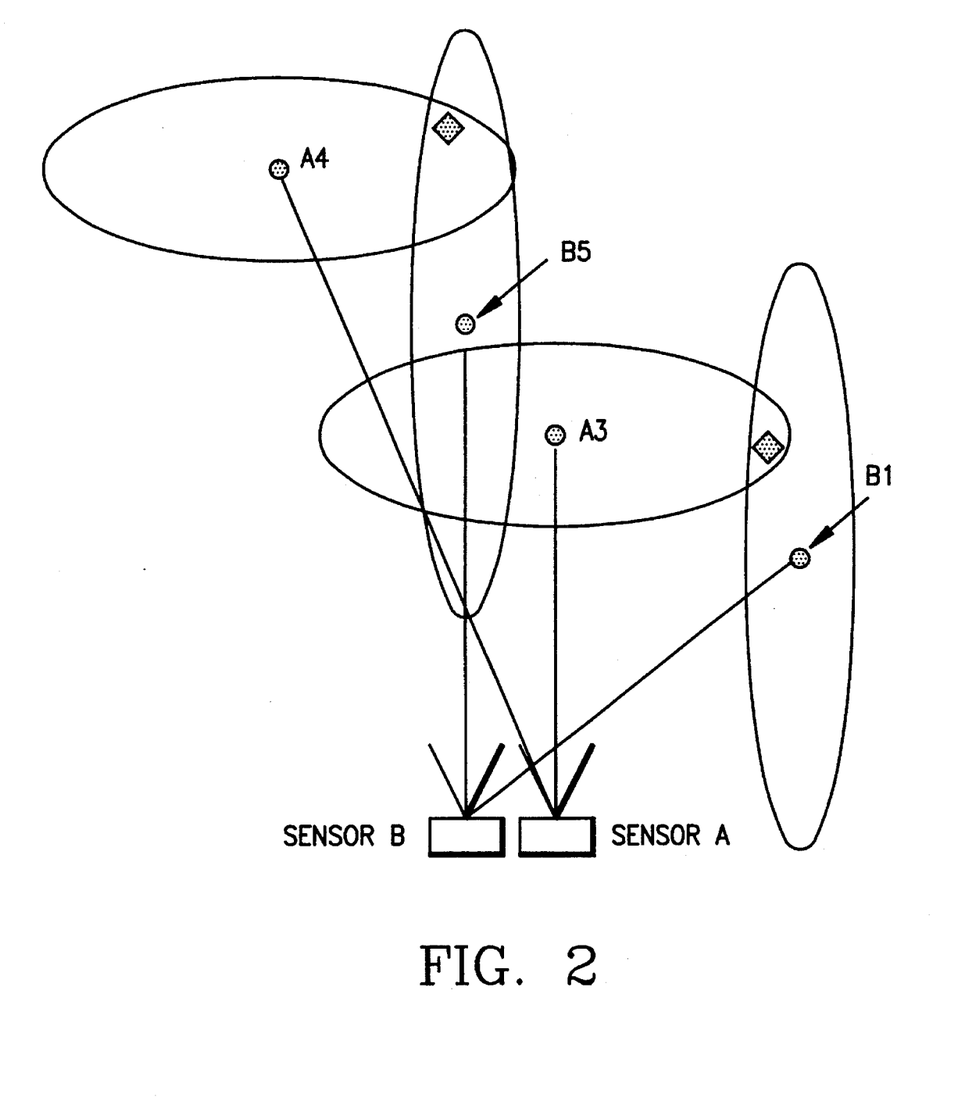
FIG. 2 is a schematic diagram further illustrating the principles of sensor fusion.

FIG. 2 illustrates the situation where the field of view includes two objects and it is known that each sensor detected only those two objects. In this case, one could use the distance between reports as the cost function to be minimized. At first glance, it appears that reports A3 and B5 would need to be associated with the same object, as in the first example, simply because they are closest and have the least cost of association. Unfortunately, the consequence of this decision is to require that report A4 be associated to B1, which has a large cost. If this were the decision, the sum of the large cost and the small cost would be greater than the sum of the costs if the associations A4 to B5 and A3 to B1 were chosen.

Figure 3:
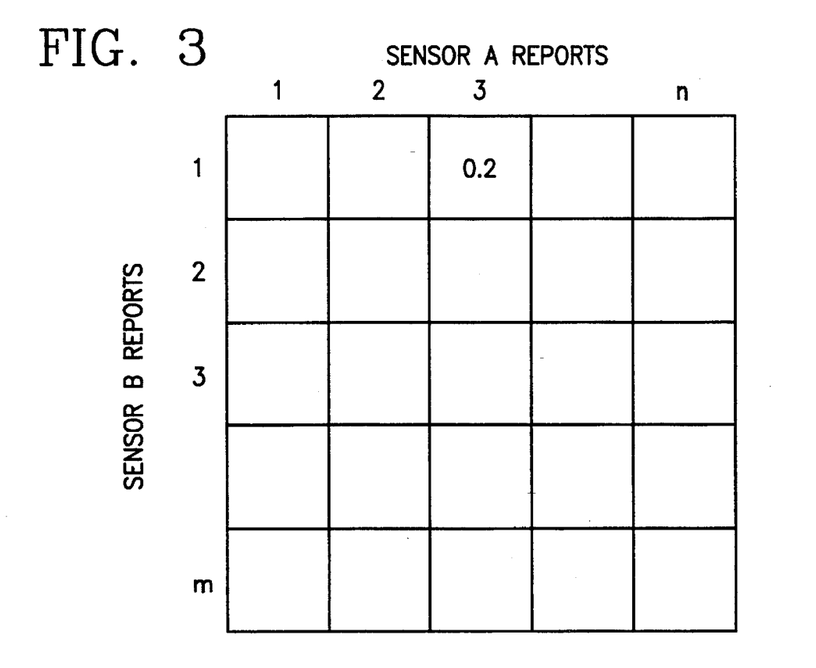
FIG. 3 shows an example of an association matrix for use in analyzing problems of type represented by the schematic diagrams of FIGS. 1 and 2.

To take into account all of the necessary associations, the complexity of which increases rapidly with increasing numbers of objects, the decisions may be formed into an association matrix, as shown in FIG. 3. This matrix contains a measure of closeness, scaled from $-1$ to $+1$, of each report from sensor A relative to each report from sensor B. Sensor A reports are indexed by column and sensor B reports are indexed by row. In this case, row 1, column 3, by way of example, contains a measure of closeness based on some function of the inverse distance between the ports B1 and A3. The closeness measure is $1-(k)(d_{ij}/d_{ave})$ for close reports and $-1$ for distant reports, where k is a positive constant, $d_{ij}$ is the distance between the ith report from sensor A to the jth report from sensor B, and $d_{ave}$ is the average of all the distances. If the two reports were at the same position, this entry be $+1$. If they were very far apart, the entry would be $-1$. In FIG. 3, the matrix entry is 0.2, indicating a possible but not excellent match.

To simplify the problem, the selection of a similarity measure may include thresholds so that reports that are too dissimilar (for example, when sensor A sees an object and sensor B does not), have entries of zero or less in the matrix, and the associations can be immediately disregarded.

An unequal number of reports from each sensor would result in a matrix that would not be square. If an entry of $+1$ in the matrix represents a match between reports sharing the same row and column, then the solution would result in a matrix with at most one $+1$ in each row, at most one $+1$ in each column, and all other entries equaling $-1$. As the size of the n×m matrix increases, the number of possible solutions containing at most one $+1$ in each row and column grows faster than N! where N is the minimum of m and n. It is clear that exhaustive searches are impractical for problems involving large matrices.

Several techniques have been devised to provide solutions where the total cost is very low (near optimal) or the lowest cost possible (optimal). For the most part, these traditional association techniques, designed to be run on conventional or parallel general purpose computers, either take too long to be practical, or produce answers that have unacceptable inaccuracies under certain conditions. In addition, the traditional techniques tend to force associations to happen even when it may be better to defer the decision until more information is available, i.e., allow some rows and columns of the association matrix to have all entries equal $-1$.

SUMMARY OF THE INVENTION

It is accordingly an objective of the invention to provide apparatus specifically designed to produce near optimal associations for very large problems, very quickly.

It is a further objective of the invention to provide a method of producing near optimal associations for very large problems which, unlike conventional optimal association techniques run on a general purpose computer, is optimized for specific apparatus.

It is a still further objective of the invention to provide a circuit capable of producing near optimal associations for very large problems, very quickly.

These objectives are achieved, according to a preferred embodiment of the invention, by providing a circuit which represents a neural network connected to resolve an association matrix from an initial state containing closeness measures to a final state with at most one + 1 in each row and column. The circuit of the preferred embodiment includes a plurality of circuit components arranged to transform and replace electrical signals representative of neuron values stored in a memory device by electrical signals obtained as a result of an iterative procedure carried out by the preferred circuit.

The term "neural network" as used herein refers to a system of simple processing elements or neurons connected together in a way that causes their interaction to converge to a stable state. The stable state is the solution to the problem to be solved. The state of each neuron is governed by a differential equation which, as it evolves with time, may be thought of as a trajectory through n×m dimensional space. In that space, special points with coordinates of + 1 and −1 can represent association matrices. Typically, a trajectory starts in the space at a point determined by sensor data and subsequently approaches one of the special points that represents an optimal or near optical association.

Figure 4:
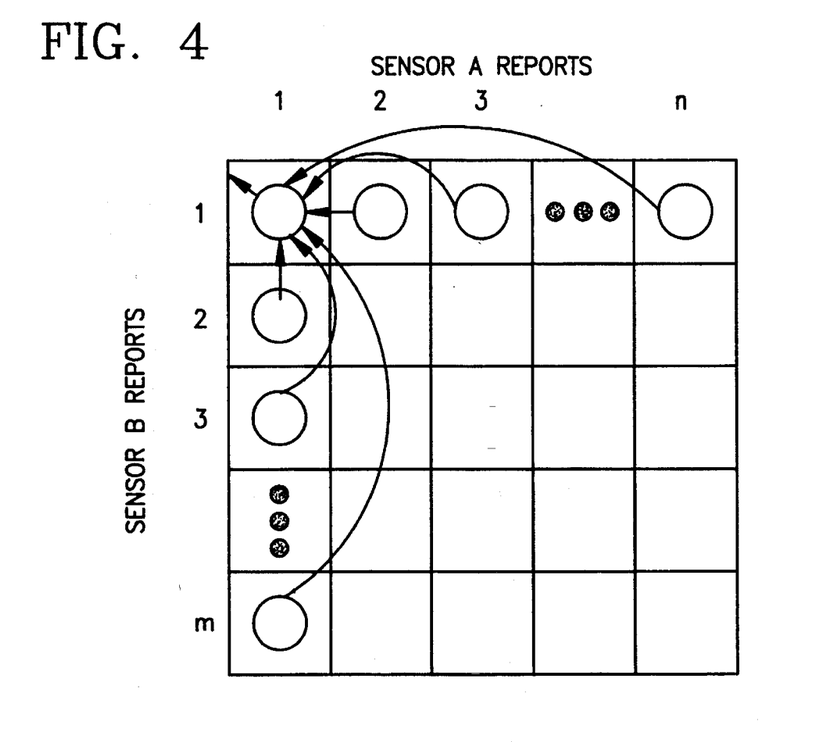
FIG. 4 is an illustration of a neural network representation for an association matrix of the type shown in FIG. 3, according to the present invention.

The preferred encoding for the solution space of the neural network is an association matrix of the type shown in FIG. 3. Each entry in the matrix has a corresponding neuron that receives its inputs from neurons belonging to the same row and column, as illustrated in FIG. 4 for the neuron at entry 1, 1. In this type of network, interconnection weights are fixed and are therefore not a function of the problem to be solved. This is a distinct advantage over other neural network models that require new weights for each problem and long set up computations. The present invention uniquely uses the association matrix to set the initial state of the matrix neurons and represents the evolution of neuron states as time advances in terms of a trajectory in state space. The trajectories ultimately converge to a stable state which represents the answer. The stable state has at most one +1 in each row and column of the neuron matrix and the remaining neurons will come to rest at −1.

The relationship between stored neuron values from one iteration to the next is conveniently described in terms of a mathematical formula. Those skilled in the art should understand, however, 1.) that the mathematical formula is merely a convenient way of describing the circuit, 2.) that any circuit in which an electrical signal is transformed can be described mathematically and that such a description does not make the circuit any less tangible, 3.) that any physical combination of electrical signals can be described as an addition or multiplication operation, 4.) that digital operations also involve manipulation of electrical signals, and 5.) that a neural network, although conveniently described in terms of matrices, is still a physical apparatus requiring a specific (albeit modifiable) arrangement of memory cells and interconnections. With these points in mind, the mathematical formula which describes how the preferred neural network operates is as follows:

$$\Delta x_i = \Delta t [-x_i - a + kG(x_i)(b - F(ROW\ j\ SUM - H(x_i) - c) - F(COL\ m\ SUM - H(x_i) - d))],$$

where $\Delta x_i$ is the change in neuron value $x_i$ from one iteration to the next, ROW j SUM and COL m SUM are variables representing the sums of functions $H(x_i)$ and $H(x_m)$ of all neuron values in the row and column containing neuron i; a, b, c, d, and k are positive constants; and H, G, and F are operators defined by functions, described in more detail below. This mathematical formula describes the evolution of neuron states as time advances as a trajectory in state space. The functions H, G, and F are ramp or ramp-approximation functions for computational simplicity (see equations (1) and (2), infra).

The apparatus of the preferred embodiment of the invention includes a state memory in which signals representative of neuron values $x_i$ are stored at locations defined by respective row and column indexes j and m. An active list memory contains addresses of all neurons with $x_i$ greater than −e. As the preferred apparatus iteratively processes neuron values, the active list memory maintains an active list containing all $x_i$'s that contribute to formation of the new neuron values. After each iteration, the active list is updated. When the neuron values converge, the active list contains the solution to the problem. The operators H, G, and F used to transform the active neuron signals during processing are applied, in this embodiment, by look-up tables, while the subtraction, addition, and multiplication functions are carried out by appropriate signal combining circuits. While some of the functions of the preferred circuit may be carried out by software, those skilled in the art will appreciate that the functions are optimally carried out by hard-wired components.

The preferred neural network operates to solve an association problem as follows:

Initially, all row and column accumulation variables stored in a row sum memory and a column sum memory are set to zero. Then, for each neuron value $x_i$ in the active list, the row index and column index are found, and $H(x_i)$ is obtained and added to the existing row and column sum variables. Next, for each neuron in the active list, a new $x_i$ is obtained by finding the row index and column index and then transforming the old $x_i$ into a new $x_i$ which varies from the old $x_i$ by an amount equal to $\Delta x_i$. The new xi is stored in the state memory if the new neuron value is greater than −e, at which time the address of the new $x_i$ is written into the active list for the next iteration. If any $\Delta x_i$ computed in an iteration is less than zero, another iteration is performed. After the last iteration, all of the neuron values in the active list are interpreted as equal to + 1, and the neurons not in the active list are interpreted as equal to −1.

DETAILED DESCRIPTION OF THE PREFERRED EMBODIMENTS

The evolution of neuron states as time advances may be represented as a trajectory in state space. These trajectories ultimately converge to a stable state which represents the answer. The stable state will have at most one + 1 in each row and column of the neuron matrix and the remaining neurons will come to rest at −1.

The output of each neuron is controlled by the following differential equation:

$$dx_i/dt = -x_i - a + kG(x_i)(b - F(\Sigma H(x_j) - c) - F(\Sigma H(x_j) - d)); j \in R_i'; m \in C_i' \quad (1)$$

where a, b, c, d, and k are constants, F, G, and H are functions, $R_i'$ is the set of indexes corresponding to input to neuron i from the same row as neuron i (not including $H(x_i)$ itself), and $C_i'$ is the set of indexes corresponding to inputs to neuron i from the same column as neuron i (not including $H(x_i)$ itself).

For computational simplicity, functions F, G and H may be represented as ramp or ramp- approximation functions limited to the closed range between 0 and 1 inclusive. More specifically:

$$F(z) = G(z) = H(z) = \{0 \text{ if } z \leq -e, 1 \text{ if } z \geq +e, \text{ and continuous and monotonic if } -e < z < +e\} \quad (2)$$

While this expression is specified only for a two-dimensional association matrix, i.e., a matrix where only two information sources are to be associated, the model may in general be expanded to cases where n sources are to be associated by adding one dimension to the matrix for each source, and by adding sum terms for each dimension.

Based on an understanding of the behavior of the dynamical system defined by equations (1) and (2), a number of computational simplifications may be made. For purposes of the invention, the following three observations are important:

1.) The trajectory of a neuron reaches a point of no return when $G(x_i) = 0$. From the description of $dx_i/dt$ in equation (1), $x_i$ will never become positive once $x_i$ goes below −e. Further, if an $x_i$ goes below −e, it does not contribute to any changes in any other neuron. Therefore, any such neuron may immediately assume an output of −1 ($x_i = -1$). When this happens, no further computations for neuron i are necessary.

2.) If a neuron output $x_i$ goes below −e, it can no longer contribute to any changes in the system, so i may be removed from the sets $R_i'$ and $C_i'$, thus saving additional computation.

3.) The sums $\Sigma H(x_i)$ and $\Sigma H(x_m)$ need not be computed for each $x_i$ separately. It is far more efficient to compute the complete sums once for all j in the given dimension (row, column, etc.) and subtract the single value $H(x_i)$ for each $x_i$ evaluation. This saves $2n^3 - 5n^2$ add operations for an n×n matrix. If n=1000, a savings of $1.995 \times 10^9$ add operations results.

The preferred embodiments of the invention utilize these observations to provide an efficient method of simulating the dynamical system as difference equations in discrete time. In addition, the circuit of the preferred embodiment takes advantage of the general principle that, where n is large, it is acceptable to find a very good answer rather than the very best as long as the answer can be found quickly. The neural network-based apparatus and method of the present invention provides a signal processing method and hardware implementation that can produce very good answers for problems of this type where n is large (in excess of 10,000) and the time required is short (on the order of seconds). It uses an iterative process applied to a neural network to quickly resolve the abovedescribed matrix, represented by stored neuron values, from an initial state containing the closeness measures, to a final state with at most one + 1 in each row and column.

Figure 5:
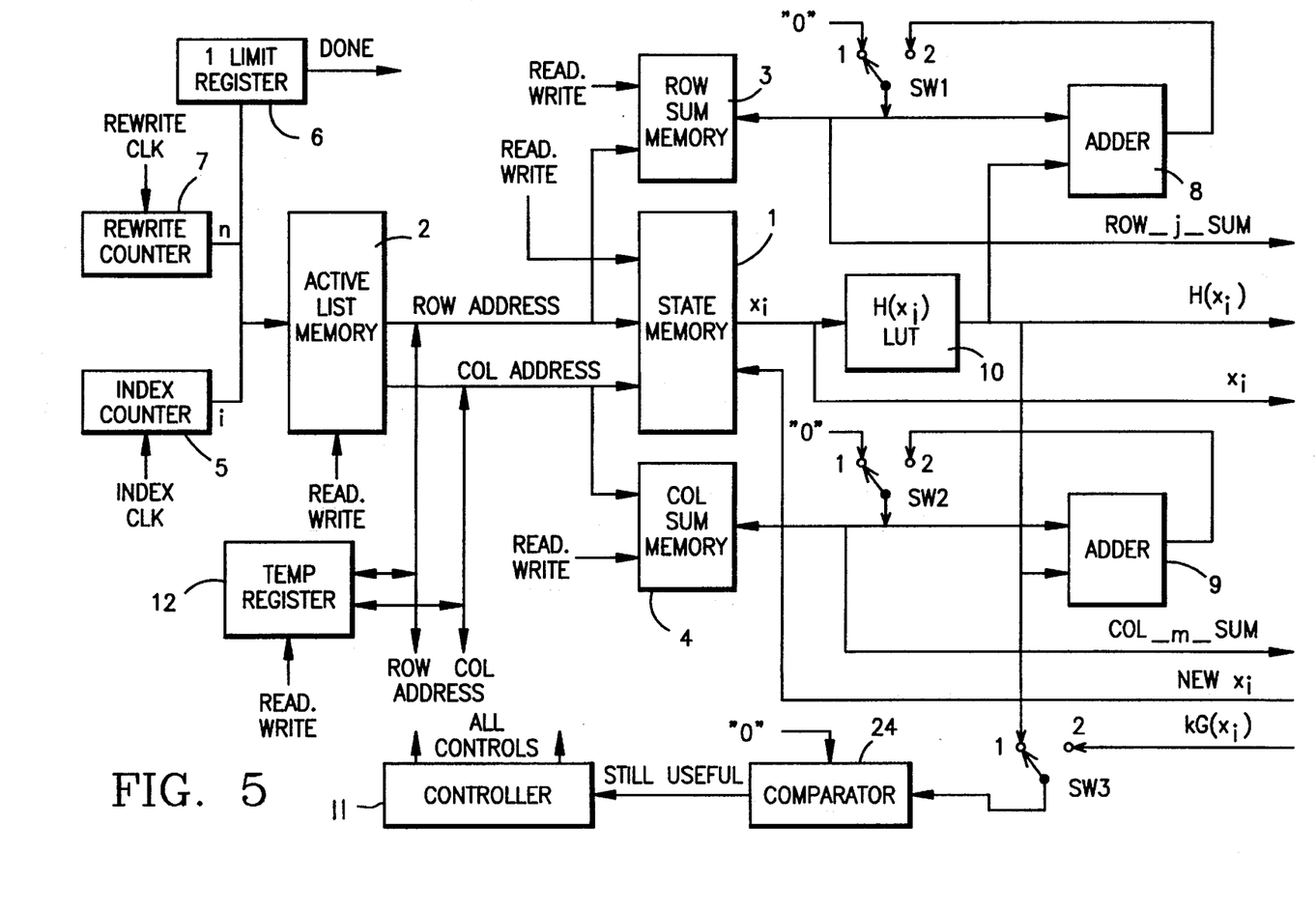
FIG. 5 is a block diagram of a hardware implementation of a neural network according to a preferred embodiment of the invention.

As shown in FIG. 5, a neural network constructed in accordance with the above-described principles of the preferred embodiment of the invention includes a state memory 1 in which signals representative of active neurons with values greater than a threshold −e are stored. All other neuron values are set equal to −1. As will be explained below, the row and column addresses for the state memory 1 are supplied by an active list memory 2 in response to the outputs of counters 5 and 7 based on index clock (index clk) and rewrite clock (rewrite clk) signals supplied by controller 11. The active list memory 2 is used to store a list of all active neurons during the initial and subsequent iterations, with the highest active list memory address being saved in an i limit register 6. The illustrated embodiment also includes two additional memories 3 and 4 for storing signals representative of respective variables ROW j SUM and COL m SUM obtained by accumulating successive outputs of a first signal transform circuit, for example a state function look-up table 10, which applies operator $H(x_i)$ to current values of $x_i$ indexed by row and column, in respective adders 8 and 9. In addition to supplying the clock signals noted above, controller 11 also supplies all other necessary read/write strobes, and controls for switches SW1–SW12, whose function will be evident from the description of the operation of the hardware below (those skilled in the art will appreciate, however, that switches SW1–SW12 could easily be eliminated and replaced by duplicate components and appropriate timing, if desired).

Figure 6:
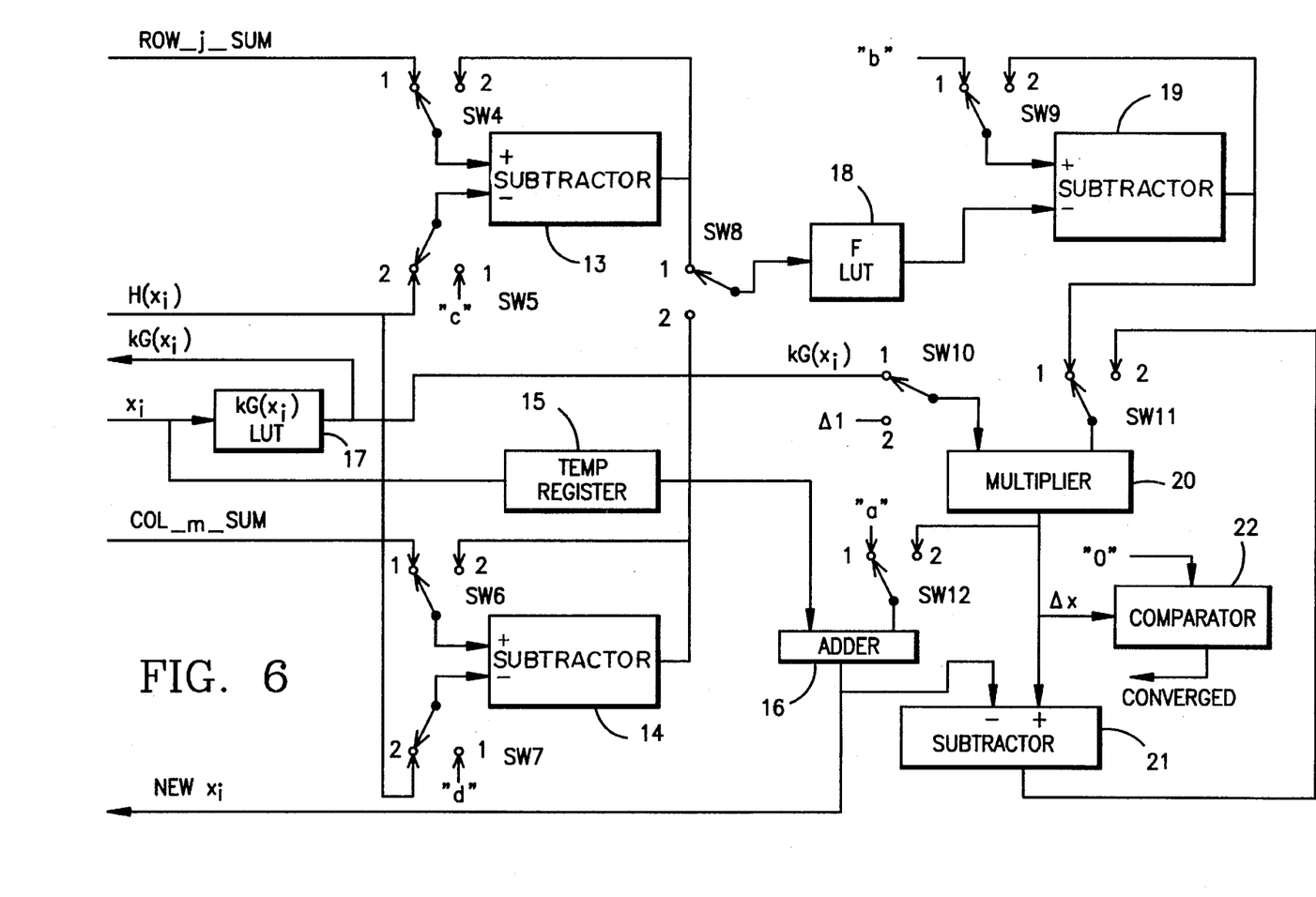
FIG. 6 is a continuation of the block diagram of FIG. 5.

The operators $kG(x_i)$ and F are preferably applied by respective second and third transform circuits, such as look-up tables 17 and 18, connected to appropriate xi outputs of the state memory 1, to outputs of subtractor circuits 13 and 14 which make up first and second signal combining circuits, and to row and column sum memories 3 and 4, as shown in FIG. 6. Additional signal processing functions, whose purpose will become more evident from the following description of function, include: (1) a fifth signal combining means in the form of an adder circuit 16 which combines a signal representative of the old neuron value with a signal representative of the change $\Delta x_i$ in the old neuron value to obtain the new neuron value; (2) a third signal combining means in the form of a subtractor circuit 19 which supplies inputs to a fourth signal combining means in the form of a multiplier circuit 20 for generating the $\Delta x_i$ signal; and (3) another subtractor circuit 21 which forms a sixth signal combining means for supplying an input to multiplier 20, to be explained below. The preferred apparatus also includes two temporary registers 12 and 15 for respectively storing addresses and $x_i$ values during processing, and comparators 22 and 24 which respectively determine whether the $\Delta x$ value, and the H or G values, are non-zero as described below (see also, observation 3, supra).

At the start of each iteration, switches SW1 and SW2 are set by controller 11 to their "1" position so that a data value of 0 is connected to the inputs of row sum memory 3 and column sum memory 4. Next, the index counter 5 starts at zero and increments to equal the contents of the i limit register 6. The output of index counter 5 serves as an address to the active list memory 2, which in turn provides the row and column coordinates of each active neuron to be computed during the iteration. The row and column coordinates form an address which is supplied to state memory 1 and which contains the current values $x_i$ of the neuron at this row and column position in the matrix. The row portion of this address is used as the address for the row sum memory 3 and the column portion of the address is used as the address for column sum memory 4. At each count, a read write strobe issued by controller 11 loads a "0" into each location in the row sum memory 3 and column sum memory 4. This resets all of the respective ROW j SUM and all COL m SUM variables stored in respective memories 3 and 4 to 0.

Switches SW1 and SW2 are then changed by controller 11 to their "2" position so that data from adders 8 and 9 may be written back to the respective row and column sum memories 3 and 4, in order to obtain a cumulative signal representative of $\Sigma H(x_i)$ which is stored in the respective memories as variables ROW j SUM and COL m SUM. The index counter 5 is reset back to zero and increments as it did at the start of the iteration, until the index count equals the contents of the i limit register 6. At each count, the contents of the row sum memory 3 and column sum memory 4 are loaded into adders 8 and 9, respectively. At the same time, the row and column addresses are used by state memory 1 to produce a current $x_i$ or $x_m$, which in turn is used as the argument for the output $H(x_i)$ or $H(x_m)$ of look-up table 10 and added to the contents of each of the sum memories using adders 8 and 9, as described above. After each add operation, the sum is written back to the respective row and column sum memories 3 and 4 by way of switches SW1 and SW2 which are in the "2" position. When the index count reaches the value in the i limit register, and the final sums are written back to the sum memories, then each memory address contains the sum of $H(x_j)$'s or $H(x_m)$'s for the corresponding row or column.

Switches SW4, SW5, SW6; and SW7 are set to their "1" position after resetting the index counter 5 and the rewrite counter 7 back to zero. For each index count between zero and the i limit contained in i limit register 6, the active row and column are stored in a temporary register 12. Subtractors 13 and 14 (see FIG. 6) reduce the signals stored in memories 3 and 4 by, respectively, a constant signal c and a constant signal d. Switches SW4, SW5, SW6, and SW7 are then changed to their "2" position so that the current $H(x_i)$ can be subtracted from the respective ROW j SUM and COL m SUM variables while again using subtractors 13 and 14. While this is happening, the current neuron value $x_i$ is stored in temporary register 15 and then added to the constant "a" input through switch 12 by adder 16. At the same time $kG(x_i)$ is retrieved from the $kG(x_i)$ look-up table 17.

Next, with switches SW8 and SW9 set to position "1", the F look-up table 18 operates on the output of subtractor 13 to obtain a signal representative of the function F(ROW j SUM–$H(x_i)$–c), which is subtracted from a signal having the value "b" supplied by the "1" position of SW9, using subtractor 19. Then switches SW8 and SW9 are switched by controller 11 to the "2" position and look-up table 18 applies the operator F to the output of subtractor 14 to obtain a signal representative of F(COL m SUM–$H(x_i)$–d). The F(COL m SUM–$H(x_i)$–d) and F(ROW j SUM–$H(x_i)$–c) are then subtracted, again using subtractor 19. With switch SW10 and SW11 in position 1, the contents of subtractor 19 (b–F(ROW j SUM–H(x)$_i$–c)–F(COL m SUM–$H(x_i)$–d)) are combined with $kG(x_i)$ using the multiplier 20. Finally, the contents of adder 16, a+$x_i$, are subtracted from the product in the multiplier using subtractor 21, switches SW10, SW11 and SW12 are changed to position "2", and the output of subtractor 21 is multiplied by $\Delta t$, again using multiplier 20. $\Delta t$ can easily be predetermined based on the time it takes for the circuit to complete an iteration. The output of multiplier 20 is a signal corresponding to the difference $\Delta x_i$ between the old and new neuron values for the current iteration.

In order to determine whether the neuron values are converging, $\Delta x_i$ is tested to determine if it is less than zero using comparator 22. If any $\Delta x_i$ is less than zero for a given iteration, the system has not yet converged and another iteration is required. Finally, the $\Delta x_i$ signal is added to the "old" neuron value $x_i$ (previously referred to as the current neuron value) using adder 16, and the resulting new neuron value $x_i$ is input to state memory 1 for use in the next iteration.

During each iteration, $H(x_i)$ and $kG(x_i)$ are also tested by comparator 1 using respective positions "1" and "2" of switch SW3. If either $H(x_i)$ or $kG(x_i)$ is greater than zero, a STILL USEFUL signal is sent to the controller 11, after which the row and column for the corresponding neuron which was previously stored in temporary register 15 is rewritten to the active list memory using an address n provided by the rewrite counter 7. Address n will always be equal to or less than the current index i output by the index counter 5. After the last neuron is computed for each iteration, the maximum count n in the rewrite counter becomes the i limit and is stored in the i limit register 6. In this way, the active list continually grows shorter until convergence is detected, at which point, the active list contains only the associated rows and columns. The final answer can be found by reading the active list memory using the index counter from zero to the i limit. Each reading provides a row and its associated column.

Those skilled in the art will appreciate that the above-described digital circuit implementation of the invention can be varied according to the principles described above without departing from the scope and spirit of the invention. For example, while memories or signal storage devices are necessary, and some type of signal accumulating and combining components or processors are also required, much of the signal processing could be accomplished by using software to configure programmable components or processors, to retrieve values from, and store values in, the memories, and to combine them in a manner similar to the manner by which the circuit of the preferred embodiment accomplishes its functions. The "signals" processed could be either digital or analog, although the illustrated embodiment is a digital circuit.

Accordingly, having described a specific embodiment of the invention in sufficient detail to enable one skilled in the art to make and use the invention, it is to be understood that modifications and adaptations of the invention may be made without departing from the spirit or scope of the invention, and it is consequently intended that the invention not be limited by the above description, but rather that it be defined solely by the appended claims.

We claim:

1. Apparatus for forming a fast optimal or near optimal association based on satisfying global constraints expressed in an association matrix, comprising:

means including a state memory for storing signals representative of neuron values $x_i$ by addresses corresponding to row and column indexes of the association matrix;

means including an active list memory for storing signals representative of a list of all active neurons that contribute to the formation of a change $\Delta x_i$ in the neuron value signals stored in the state memory;

means for processing the signals representative of active neurons to approximate trajectories representing an evolution of neuron states at discrete intervals of time $\Delta t$ to obtain signals representative of the change $\Delta x_i$ in the neurons at said intervals;

means for replacing the neuron value signals stored in the state memory by signals representative of $x_i+\Delta x_i$;

means for writing the row and column address of $x_i$ into the active list memory for a next iteration, if any $\Delta x_i$ is less than zero;

means for replacing all neuron value signals corresponding to active neurons stored in the active list by a signal representative of 1.0 if, after any iteration, $\Delta X_i$ is zero or greater.

2. Apparatus as claimed in claim 1, wherein the processing means comprises:

means for addressing a memory location where a neuron value signal $x_i$ is stored by row and column indices j and m in order to sequentially process the neuron value signals one at a time;

first signal transform means for transforming the signal representative of neuron value $x_i$ into a signal representative of an operator $H(x_i)$;

row and column sum accumulation means including row and column sum memories for accumulating the sums ROW j SUM, COL m SUM, and $H(x_i)$ for each active neuron during an iteration;

second signal transform means for transforming signal values representative of $x_i$ into signals representative of $kG(x_i)$;

first signal combining means for combining the ROW j SUM, COL m SUM, and $H(x_i)$ signals to form signals representative of (ROW j SUM–$H(x_i)$) and (COL m SUM–$H(x_i)$);

second signal combining means for combining signals representative of constant values c and d with the signals representative of (ROW j SUM–$H(x_i)$ and (COL m SUM–$H(x_i)$) to from signals representative of the differences (ROW j SUM–$H(x_i)$–c) and (COL m SUM–$H(x_i)$–d);

third signal transform means for transforming the (ROW j SUM–$H(x_i)$–c) and (COL m SUM–$H(x_i)$–d) into signals representative of an operator F(ROW j SUM–$H(x_i)$–c) and F(COL m SUM–$H(x_i)$–d);

third signal combining means for combining the F(ROW j SUM–$H(x_i)$–c) and F(COL m SUM–$H(x_i)$–d) signals with a constant signal b to obtain a signal representative of b–F(ROW j SUM–$H(x_i)$–c)–F(COL m SUM–$H(x_i)$–d);

fourth signal combining means for combining the signal representative of b–F(ROW j SUM–$H(x_i)$–c)–F(COL m SUM–$H(x_i)$–d) with the signal representative of $kG(x_i)$ to obtain a signal representative of $kG(x_i)$(b–F(ROW j SUM–$H(x_i)$–c)–F(COL m SUM–$H(x_i)$–d));

fifth signal combining means for combining the signal representative of $kG(x_i)$(b–F(ROW j SUM–$H(x_i)$–c)–F(COL m SUM–$H(x_i)$–d)) with a constant signal a and with a current neuron value signal $x_i$ to form a signal representative of $-x_i-a+kG(x_i)$(b–F(ROW j SUM–$H(x_i)$–c)–F(COL m SUM–$H(x_i)$–d)); and sixth signal combining means for combining the signal representative of $-x_i-a + kG(x_i)$(b–F(ROW j SUM–$H(x_i)$–c)–F(COL m SUM–$H(x_i)$–d)) with a constant signal $\Delta t$ to form a signal representative of $\Delta t(-x_i-a+kG(x_i)$(b–F(ROW j SUM–$H(x_i)$–c)–F(COL m SUM–$H(x_i)$–d))), the signal representative of $\Delta t(-x_i-a+kG(x_i)$(b–F(ROW j SUM–$H(x_i)$–c)–F(COL m SUM–$H(x_i)$–d))) also representing $\Delta x_i$.

3. Apparatus as claimed in claim 2, wherein said first signal transform means includes a look-up table.

4. Apparatus as claimed in claim 2, wherein operators H, G, and F are identified in the state equation $dx_i/dt=-x_i-a+kG(x_i)(b-F(\Sigma H(x_i)-c)-F(\Sigma H(x_m)-d))$; $j\epsilon R_i'$; $m\epsilon C_i'$; and where $R_i'$ is a set of indexes corresponding to inputs to the ith neuron from the same row as the ith neuron, not including the ith neuron, and $C_i'$ is the set of indexes input to the ith neuron from the same column as the ith neuron, not including the ith neuron.

5. Apparatus as claimed in claim 2, wherein said row and column sum accumulation means includes adder circuits having respective inputs connected to outputs of the first signal transform means and the row and column sum memories, and respective outputs connected to inputs of the row and column sum memories.

6. Apparatus as claimed in claim 2, wherein said first signal combining means includes subtractor circuits having inputs connected respectively to the outputs of the row and column sum memories and the first signal transform means.

7. Apparatus as claimed in claim 6, wherein the second signal combining means includes: (1) said subtractor circuits and means including first switches for switching between sources of said constant signals c and d and said output of the first signal transform means; and (2) means including second switches for switching the inputs connected to the row and column sum memory outputs between respective outputs of the subtractor circuits and the row and column sum memory outputs.

8. Apparatus as claimed in claim 2, wherein said third signal combining means includes a subtractor circuit and means for switching one input of the subtractor circuit between a source of a constant signal b and an output of the subtractor circuit, a second input of the subtractor circuit being connected to the third signal transform means.

9. Apparatus as claimed in claim 2, wherein said fourth signal combining means includes a multiplier circuit having respective inputs connected to outputs of the third signal combining means and the second signal transform means.

10. Apparatus as claimed in claim 2, wherein said fifth signal combining means includes an adder circuit and means for switching a first input of the adder circuit between a source of a constant signal a and an output of the fourth signal combining means, and a second input connected to the output of the state memory through temporary register means for delaying a current neuron value signal $x_i$ by an amount sufficient to obtain an output from the fourth signal combining means.

11. Apparatus as claimed in claim 10, wherein the sixth signal combining means includes a first input connected to an output of the adder circuit, a second input connected to the output of the fourth signal combining means, and an output connected to an input of the fourth signal combining means through means for switching between an output of the third signal combining means and an output of the sixth signal combining means.

12. Apparatus as claimed in claim 11, wherein an input of the state memory is connected to an output of the adder circuit, and further comprising a comparator circuit having a first input connected to an output of the fourth signal combining means; a second input connected to a constant signal source representative of zero; and means connected to the state memory for supplying a non-convergence signal to the state memory when $\Delta x_i$ is less than zero, said non-convergence signal causing the state memory to input a new neuron value $x+\Delta x_i$ from the adder circuit for use in a next iteration.

13. Apparatus as claimed in claim 1, further comprising temporary register means for starting a row and column address for an active neuron and means for comparing respective outputs of the first and second signal transform means with zero and, if either signal transform means output is greater than zero, rewriting the stored row and column address to the active list memory using an address n provided by a rewrite counter.

14. Apparatus as claimed in claim 1, further comprising indexing means including an index counter and a rewrite counter connected to an input of the active list memory and to an i limit register, and means for replacing an i limit stored in the i limit register by a maximum count n in the rewrite counter after a last neuron is processed for each iteration, whereby the active list continually grows shorter until convergence is detected.

15. A method of forming fast optimal or near optimal associations based on satisfying global constraints expressed in an association matrix, comprising the steps of:

a. storing signals representing elements of the association matrix as neuron state values $x_i$ in a state memory;

b. storing a list of addresses in an active list memory;

c. indexing the list to supply a single one of said $x_i$ signals to a processing circuit for processing;

d. processing the $x_i$ signals to obtain a signal $\Delta x_i$;

e. combining the $x_i$ and $\Delta x_i$ signals to obtain an $x_i+\Delta x_i$ signal;

f. comparing the $\Delta x_i$ signal with a zero signal and, if any $\Delta x_i$ signal obtained during an iteration is less than zero, performing another iteration.

16. A method as claimed in claim 15, wherein the processing means comprises:

d1. indexing the $x_i$ signals by row and column indices j and m in order to sequentially process the $x_i$ signals one at a time;

d2. transforming a current $x_i$ signal into a signal representative of an operator $H(x_i)$;

d3. accumulating signals representative of $H(x_i)$ to form signals representative of the sums ROW j SUM and COL m SUM of $H(x_i)$ for each active neuron during an iteration;

d4. transforming $x_i$ into a signal $kG(x_i)$;

d5. combining the ROW j SUM, COL m SUM, and $H(x_i)$ signals to form signals representative of (ROW j SUM–$H(x_i)$) and (COL m SUM–$H(x_i)$);

d6. combining signals representative of constant values c and d with the signals representative of (ROW j SUM–$H(x_i)$) and (COL m SUM–$H(x_i)$) to form signals representative of the differences (ROW j SUM–$H(x_i)$–c) and (COL m SUM –$H(x_i)$–d);

d7. transforming the (ROW j SUM–$H(x_i)$–c) and (COL m SUM–$H(x_i)$–d) into signals representative of an operator F(ROW j SUM–$H(x_i)$–c) and F(COL m SUM–$H(x_i)$–d);

d8. combining the F(ROW j SUM–$H(x_i)$–c) and F(COL m SUM–$H(x_i)$–d) signals with a constant signal b to obtain a signal representative of b–F(ROW j SUM–$H(x_i)$–c)–F(COL m SUM–$H(x_i)$–d);

d9. combining the signal representative of b–F(ROW j SUM–$H(x_i)$–c)–F(COL m SUM–$H(x_i)$–d) with the signal representative of $kG(x_i)$ to obtain a signal representative of $kG(x_i)$(b–F(ROW j SUM–$H(x_i)$–c)–F(COL m SUM–$H(x_i)$–d));

d10. combining the signal representative of $kG(x_i)$(b–F(ROW j SUM–$H(x_i)$–c)–F(COL m SUM–$H(x_i)$–d)) with a constant signal a and with a current neuron value signal $x_i$ to form a signal representative of $-x_i-a+kG(x_i)$(b–F(ROW j SUM–$H(x_i)$–c)–F(COL m SUM–$H(x_i)$–d)); and d11. combining the signal representative of $-x_i-a+kG(x_i)$(b–F(ROW j SUM–$H(x_i)$–c)–F(COL m SUM–$H(x_i)$–d)) with a constant signal $\Delta t$ to form a signal representative of $\Delta t(-x_i-a+kG(x_i)$(b–F(ROW j SUM–$H(x_i)$–c)–F(COL m SUM–$H(x_i)$–d))), wherein the signal representative of $\Delta t(-x_i-a+kG(x_i)$(b–F(ROW j SUM–$H(x_i)$–c)–F(COL m SUM–$H(x_i)$–d))) also represents $\Delta x_i$.

17. A method as claimed in claim 16, wherein steps d2, d4, and d7 respectively comprise the steps of inputting the xi signals to look-up tables.

18. A method as claimed in claim 16, wherein operators H, G, and F and threshold value e are defined by the state equations $dx_i/dt=-x_i-a+kG(x_i)(b-F(\Sigma H(x_i)-c)-F(\Sigma H(x_m)-d))$; $j\epsilon R_i'$; $m\epsilon C_i'$, and where $R_i'$ is a set of indexes corresponding to inputs to the ith neuron from the same row as the ith neuron, not including the ith neuron itself, and $C_i'$ is the set of indexes input to an ith neuron from the same row as the ith neuron, not including the ith neuron itself.

19. A method as claimed in claim 16, wherein step d3 comprises the step of adding together Successive $H(x_i)$ signals and writing a sum of the successive $H(x_i)$ signals into a row sum memory for each active neuron in a row and into a column sum memory for each active neuron in a column.

20. A method as claimed in claim 16, wherein step d5 comprises the step of retrieving the ROW j SUM and COL m SUM signals from respective row and column sum memories and combining them with the $H(x_i)$ signal by means of subtractor circuits.

21. A method as claimed in claim 20, wherein step d6 comprises the step of combining the (ROW j SUM), (COL m SUM), c, and d signals by means of said subtractor circuits, said combining step comprising the steps of operating first switches to switch inputs of the subtractor circuits between sources of said constant signals c and d and said $H(x_i)$ signal, and then operating second switches to switch inputs of the subtractor circuits which are connected to outputs of the row and column sum memories between respective outputs of the subtractor circuits and the row and column sum memory outputs.

22. A method as claimed in claim 16, wherein step d8 comprises the step of operating a switch to switch an input of a subtractor circuit between a source of a constant signal b and an output of the subtractor circuit, and inputting the signals representative of F(ROW j SUM–$H(x_i)$–c)and F(COL m SUM–$H(x_i)$–d) to a second input of the subtractor circuit.

23. A method as claimed in claim 16, wherein step d9 comprises the step of combining the (b–F(ROW j SUM–$H(x_i)$–c)–F(COL m SUM–$H(x_i)$–d)) and $kG(x_i)$ signals by means of a multiplier circuit.

24. A method as claimed in claim 23, wherein step d 10 comprises the steps of switching a first input of an adder circuit between a source of a constant signal a and an output of the multiplier circuit, and retrieving a current neuron value signal from the state memory through a temporary register which delays the current neuron value signal xi by an amount sufficient to obtain an output from the multiplier.

25. A method as claimed in claim 24, wherein step d11 comprises the step of switching a first input of the multiplier circuit from a source of the $-x_i-a+kG(x_i)$(b–F(ROW j SUM–$H(x_i)$–c)–F(COL m SUM–$H(x_i)$–d)) signal to a source of a signal $\Delta t$ which represents an interval of time at which values of $\Delta x_i$ are captured, to obtain a signal representative of $\Delta x_i$.

26. A method as claimed in claim 15, wherein step f comprises the steps of writing $x+\Delta x_i$ into the state memory after comparing the $\Delta x_i$ signal with zero.

27. A method as claimed in claim 15, further comprising the steps of temporarily starting a row and column address for an active neuron and comparing the respective $H(x_i)$ and $G(x_i)$ signals with zero and, if either $H(x_i)$ or $G(x_i)$ is greater than zero, rewriting the stored row and column address to the active list memory using an address n provided by a rewrite counter.

28. A method as claimed in claim 15, further comprising the step of replacing an i limit stored in an i limit register by a maximum count n in a rewrite counter after a last neuron is processed for each iteration, whereby the active list continually grows shorter until convergence is detected.

29. A method for forming a fast optimal or near optimal association based on satisfying global constraints expressed in an association matrix, comprising the steps of:

a. storing in a state memory signals representative of neuron values $x_i$ by addresses corresponding to row and column indexes of the association matrix;

b. storing in an active list memory signals representative of a list of all active neurons that contribute to the formation of a change $\Delta x_i$ in the neuron value signals stored in the state memory;

c. processing the signals representative of active neurons to approximate trajectories representing an evolution of neuron states at discrete intervals of time $\Delta t$ to obtain said signals representative of the change $\Delta x_i$ in the neurons at said intervals;

d. replacing the neuron value signals stored in the state memory by signals representative of $x_i+\Delta x_i$;

e. writing row and column addresses into the active list memory for a next iteration, if any $\Delta x_i$ is less than zero;

f. replacing all neuron value signals corresponding to active neurons stored in the active list by a signal representative of 1.0 if, after any iteration, $\Delta x_i$ is zero or greater.

* * * * *